March 22, 1949.   P. A. BORDEN ET AL   2,465,191
SELF-BALANCING TELEMETRIC RECEIVER
Filed Nov. 27, 1944

INVENTORS
Perry A. Borden
Gustave M. Thynell
BY
E. C. Sanborn
Attorney

Patented Mar. 22, 1949

2,465,191

UNITED STATES PATENT OFFICE 2,465,191

SELF-BALANCING TELEMETRIC RECEIVER

Perry A. Borden, Waterbury, and Gustave M. Thynell, Naugatuck, Conn., assignors to The Bristol Company, Waterbury, Conn., a corporation of Connecticut Application November 27, 1944, Serial No. 565,352

10 Claims. (Cl. 177—351)

1

This invention relates to telemetric apparatus. It is more particularly concerned with receiving apparatus especially adapted for advantageous operation in a telemetering system of the impulse-duration class wherein the frequency of the cyclically transmitted impulse is of a relatively high order. Telemetering systems of the impulse-duration class are well known, and are exemplified in U. S. Letters Patent No. 1,822,683, granted September 8, 1931, to K. Wilde, and reissued as No. 19,039, January 2, 1934, and also in U. S. Letters Patent No. 1,954,850, granted April 7, 1934, to C. H. Smoot, and reissued as No. 20,695, April 12, 1938. In each of these patents and reissues a continuously operating mechanical transmitting device, in cooperation with an index or pointer deflecting with variation in a measured magnitude, serves to impress upon an electrical circuit a series of cyclically recurring impulses of durations varying with said magnitude, while a suitable mechanical receiving instrument responds to said impulses in a sense to translate them into a useful exhibition of the measurement performed by the transmitting device. In telemetering systems of this class, where the frequency of recurrent cyclical impulses is not over one per second, it is quite practicable, for the purpose of providing at the receiving end of the system a measure of the magnitude represented by the transmitted impulses, to utilize a device embodying electromagnetically operated clutches or the equivalent, tending at all times to position an indicating pointer or index, or a recording stylus, at a definite point with respect to a graduated scale. A preferred form of such an instrument is fully described and set forth in U. S. Letters Patent No. 2,040,918, granted to C. W. Bristol, May 19, 1936.

It will be obvious that receiving instruments of the type having clutches or equivalent mechanical devices of an intermittently engaging nature, will be unsuited for use in conjunction with a system where successive impulses are applied with a frequency much exceeding that of one per second; and if such frequencies of recurrent impulses are utilized, it follows that special means will be necessary in order to obtain a mechanical deflection or other useful exhibition representing in magnitude the quantity which is being measured and transmitted. A telemetering system of the impulse-duration class, in which the frequency of the recurrent impulses is that of a commercial alternating current system (e. g. 25 cycles, or 60 cycles, per second) is fully described and set forth in copending application Serial No. 545,501, filed July 18, 1944, by G. M. Thynell, one of the present inventors; and it is for use as a receiver in conjunction with a telemetering system of the type therein set forth that the present invention is especially adapted.

2

It is an object of the present invention to provide an instrument adapted to the measurement, in proportion to total elapsed time, of the time occupied by impulses of variable duration and recurrent with a frequency of the order of or higher than that of a commercial alternating current electrical supply.

It is a further object to provide an instrument of the above class in which the measure exhibited thereby shall be independent of the amplitude or the frequency of said impulses through a wide range of variation of said magnitudes.

It is a further object to provide an instrument of the above class in which the measurement shall be performed without resort to the use of mechanism involving continuously moving parts.

It is a further object to provide an instrument of the above class which, having an accuracy dependent essentially upon the relative resistance values of elements in an electrical circuit, shall be inherently self-standardizing in its measurements.

In the embodiment herein described for carrying out the purposes of the invention, it is proposed to utilize a circuit embodying a potentiometer network having a slide-wire or equivalent tapped resistance unit, connected to a source of electrical energy and carrying an uninterrupted current to establish a potential gradient, and to balance against said gradient the mean value of a potential having an amplitude corresponding to the voltage of said source, and applied in cyclically recurrent impulses having durations corresponding to those developed by a transmitting device of the class described. It is further proposed to incorporate in said circuit such elements as shall inherently compensate for error due to non-linearity of the circuit when operated on a non-regulated voltage.

Other features of the invention will be hereinafter described and claimed.

Figure 1:
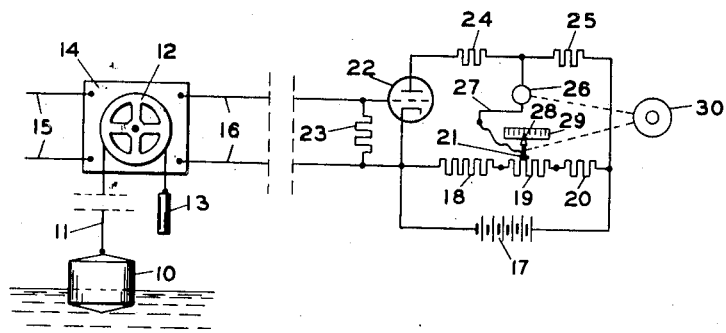
Fig. 1 is an elementary diagram of a telemetering system embodying the circuit upon which the principle of the invention is based.

Referring now to the drawings:

Fig. 1 is an elementary diagram of a telemetering system embodying the circuit upon which the principle of the invention is based, and adapted to the purpose of providing a remote measurement of the level of a liquid. A float 10, connected by a flexible cable 11 to a sheave or drum 12, and partially balanced by a counterweight 13, is adapted to provide a measure of the level of the liquid upon whose surface said float rests, by correspondingly adjusting the angular position of the drum 12. The shaft or spindle of the drum 12 is suitably journaled in a transmitting unit 14 embodying the principle fully set forth and described in the hereinbefore mentioned Thynell application, whereby successive unidirectional electrical impulses derived from an A.-C. source 15, and modified to have their durations proportional to the angular position of said drum, may be impressed upon a suitable two-conductor transmitting circuit 16.

The terminals of the circuit 16 at the end of said circuit remote from the instrument 14, are connected to the circuits of a receiving network adapted to translate said impulses into a measure representative of the magnitude corresponding to the angular position of the drum 12 in the transmitting instrument. The receiving network comprises two parallel groups of resistance units both supplied with current from a common battery or equivalent source 17. One of said groups, directly connected across the terminals of said battery comprises a series arrangement of three resistance units 18—19—20 in order from the negative to the positive terminal of said battery, these resistors being of fixed value, and the resistor 19 taking the form of a slide-wire having in electrical engagement therewith a movable contact 21.

A triode 22 having a cathode rendered electron-emissive by means not shown in the drawing, a control grid, and a plate, is connected to the transmitting circuit 16 and also to the receiving network. As shown, the cathode is connected to the negative terminal of the battery 17 and also to one side of the circuit 16. The grid of said triode is connected to the cathode through a suitable grid resistor 23, and to the other side of the circuit 16. The plate is connected in series with two suitable fixed resistors 24 and 25 to the positive terminal of the battery 17.

From the junction point between the resistors 24—24 a connection is provided through a galvanometer 26 and a conductor 27, including a flexible portion, to the sliding contact 21, which contact is also fitted with an index or pointer 28, adapted to provide in its relation to a graduated scale 29 a measure of the deflected position of the sliding contact 21 with respect to the slide wire resistor 19. If desired, the sliding contact 21 may be made responsive to deflections of the galvanometer 26 in a sense to adjust the circuit to such a condition that no current will be flowing through the galvanometer, by means of a servomotor 30 commanded by said galvanometer and in turn actuating said sliding contact. according to any one of a number of methods well known in the art of electrical measurement and control. A preferred form of servomotor system for this purpose is fully set forth and disclosed in U. S. Letter Patent No. 2,320,066, granted to F. B. Bristol May 25, 1943.

The operation of the apparatus as thus far set forth, may be outlined as follows: Through the three resistors 18—19—20 connected in series across the terminals of the battery 17, there will flow a constant current having its value determined by the resistance of the circuit, including said resistors and said battery, in relation to the voltage of said battery. Flow of current through the resistors 24—25 in series will depend upon conditions in the triode 22. If the potential between the grid and cathode of said triode be such as to block the passage of current therethrough, the value will of course be zero. If said potential be such as to permit the flow of current, the magnitude of said current will depend upon the combined resistance value of the resistors 24—25 in series and the path provided by the triode 22. If the emission in said triode is maintained by a constant value, and the magnitude of grid voltage at the time of the application of impulses be constant, the equivalent resistance of the triode will be constant, with the result that during each of said impulses there will flow a current dependent in value upon the total resistance of the output circuit of the triode 22 in relation to the voltage of the battery 17. Under these conditions, the mean value of current flowing in said output circuit will bear to the value of current flowing in the resistors 18—19—20 a relation which will be a measure of the durations of the impulses of applied grid voltage in relation to total elapsed time. By proper selection of the values of the several fixed resistors in the circuit in relation to each other, and to the effective resistance of the triode 22, the potential across the resistor 19 may be made such as to represent the range of values through which will pass the potential of the junction point between resistors 24—25 as the impulses of current emanating from the plate of triode 22 vary from a minimum to a maximum time interval, as governed by the corresponding impulses of grid voltage derived from the circuit 16. It will thus be possible, by adjustment of the sliding contact 21 along the slide wire 19, to locate a point on said slide wire where the galvanometer 26 will attain a condition of balance; and said point as indicated upon the scale 29 by the index 28 attached to contact 21 will be a measure of the durations of the impulses in the circuit 16 with respect to elapsed time, and therefore of the position of the sheave or drum 12 in the transmitting instrument 14, i. e., the level of the liquid upon which rests the float 10.

Since the current flowing through the resistors 24—25 is of an intermittent nature, it may be necessary to provide suitable damping for the galvanometer 26; but, as the frequency of impulses of said current is of a relatively high order, with respect to the period of the galvanometer, such damping presents no difficulties to those versed in the art of electrical measurement. By causing the contact 21 to be automatically positioned by the motor 30 under command of contacts carried by the galvanometer 26, hereinbefore set forth, the pointer attached to said contact will continuously tend to provide an indication on the scale 29 which may be interpreted in terms of the liquid level or other variable being measured at the transmitting instrument 14.

Figure 2:
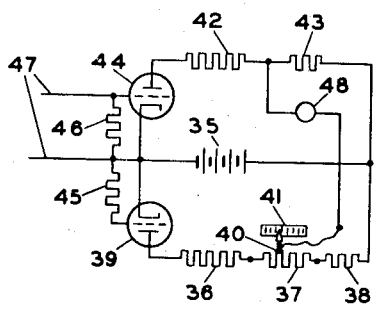
Fig. 2 is a diagram showing a means of compensating for non-linearity of the circuit shown in Fig. 1.

Because of the non-linear characteristics of electron tubes when operated with varying plate voltage, it follows that with a circuit as shown in Fig. 1 the equivalent resistance of the triode 22 may vary with change in the voltage of the supply source 17. Thus, during the intervals when the tube 22 is conductive, the total resistance of the portion of the circuit including said tube and resistors 24—25 may vary, while that branch of the circuit including the resistors 18—19—20 will remain constant. Under such circumstances, the ratio of the currents flowing in the two circuit branches will vary independently of the durations of the impulses of the grid voltage, with a corresponding error in the ultimate measurement. The voltage error due to non-linearity of tube characteristics may be minimized by imparting mutually similar characteristics to the two branches of the circuit in which the currents are under comparison. This may be effected by the arrangement shown in Fig. 2. Supplied from a battery 35 of equivalent source of unidirectional current, is a circuit having two branches in parallel. One of these branches includes resistors 36, 37 and 38, as well as the anode and cathode of a triode 39, all said elements being connected in series and continuously energized from the battery 35. The resistor 37 takes the form of a slide wire having a movable contact 40 associated therewith and fitted with an index adapted to provide upon a scale 41 an indication of the translated position of said contact. The other branch of the circuit supplied from the source 35 includes two resistors 42—43 together with the anode and cathode of a triode 44, all said elements being connected in series. The triodes 39 and 44 are arranged in such a manner that their cathodes are connected to the negative terminal of the source 35; and the grids of said tubes are also connected to said terminal in series with suitable resistors 45—46 respectively. One side of a circuit 47 from the transmitting instrument is connected to the common point of the cathodes of the triodes 39 and 44, and the other side of said circuit to the grid of the latter triode. Between the junction point of the resistors 42—43 and the sliding contact 40 is connected a circuit including a galvanometer 48 adapted to provide an indication of a balanced condition in the network.

It will be apparent, that, by suitably selecting and proportioning the resistors and the electron tubes in the network supplied from the source 35 there may be established a condition wherein the deflection of the galvanometer 48 may be reduced to zero by positioning the movable contact 40 with respect to the slide wire 37. Under operating conditions, when no external potential is being applied to the grids of the triodes, the resistors 45—46 will serve to maintain said grids at equal potentials with respect to the corresponding cathodes. If, under these conditions, the voltage of the source 35 should be caused to vary, the plate potentials of the two triodes will be changed by a similar amount, and the equivalent resistances of said tubes will remain mutually equal. Since the other resistances in the two branches of the circuit are of fixed value, it follows that variations in the voltage of the source 35 will not affect the ratio of currents flowing in the two branches of the circuit, and therefore will not disturb such balance conditions as may be established by the setting of the movable contact 40.

Upon the application of impulses from the transmitting line 47, the tube 44 will be rendered intermittently conductive, so that the current in the plate circuit of said tube will vary in a series of impulses of durations corresponding to those received over the circuit from the transmitting instrument. In the manner hereinbefore set forth in connection with the form of the invention shown in Fig. 1, the contact 40 may be so positioned as to establish a condition of balance in the network, whereupon the indication of the index attached to the said contact will provide with respect to the scale 41 a measure of the mean of said impulses in relation to the current flowing in the plate circuit of the triode 39.

Figure 3:
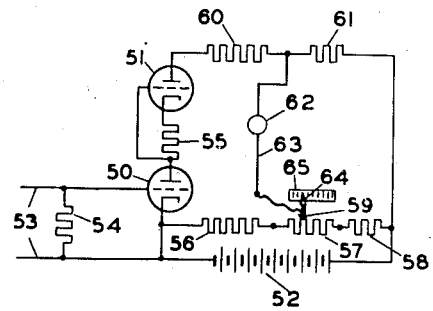
Fig. 3 shows diagrammatically an alternative means for eliminating sources of error in circuits embodying the principles of the invention.

An alternative method by which voltage errors may be eliminated lies in the introduction of circuit compensating elements to render the tube characteristics substantially linear over the working range; and this may readily be accomplished by a number of methods more or less well known in the art, of which the following may be taken as a typical example. Connected in series or cascade as shown in Fig. 3, are two suitably selected triodes 50—51, each having a cathode, an anode, and a control grid. The cathode of the tube 50 is connected to the negative terminal of a battery 52, and also to one side of a two-conductor circuit 53 conveying impulses from a transmitting instrument not shown in the drawing. The other side of said circuit is connected to the grid of the triode 50, which is also shunted to the cathode thereof by a suitable grid resistor 54. The anode of said triode is connected directly to the grid of the tube 51 and through a cathode-bias resistor 55 to the cathode of the same. The potentiometer network by means of which the average value of impulses in the circuit 53 is determined is identical to that shown in Fig. 1, comprising two parallel groups of resistor units, both supplied with current from the battery 52. One of said groups, directly connected across the terminals of said battery comprises three resistors 56—57—58 in order from the negative to the positive terminal of said battery, these resistors being of fixed value and the resistor 57 taking the form of a slide wire having in electrical engagement therewith a movable contact 59. The anode of the triode 51 is connected through two fixed resistors 60—61 in series to the positive terminal of the battery 52. From the junction point between the resistors 60—61 a connection is provided, through a galvanometer 62 and a conductor 63 including a flexible portion, to the sliding contact 59, which contact is also provided with an index or pointer 64 adapted to provide in its relation to a graduated scale 65 a measure of the deflected position of the sliding contact 59 with respect to the slide wire resistor 57.

In operation, the cascade connection of the tubes 50—51 tends to confer linearity upon the system by virtue of the potential drop in the grid-bias resistor due to the flow of current therethrough. Under steady-state conditions, and with no potential applied to the grid of the triode 50, the potential of the battery 52 will establish through the tubes 50—51, and the resistors 60—61 in series a current whose value will be determined by the combined resistance of said tubes and resistors in relation to the voltage of said battery. Current flowing through the resistor 55 will establish a potential difference between the grid and cathode of triode 51, which potential difference will tend to affect the value of plate current in said tube. By properly selecting the value of resistor 55 with respect to other elements of the circuit, its effect may be made compensatory, to the extent that the over-all equivalent resistance of the electron paths through the tubes 50—51 in series will remain substantially constant over a wide range of variation of plate voltage.

By applying to the grid of the tube 50 voltage impulses from the circuit 53 of amplitude within a suitable predetermined range, and of durations established by the instrument at the transmitting end of said circuit, the branch of the network including the triodes 50—51 may be rendered intermittently conductive, whereby the timing of said impulses may be reproduced in the flow of current through the said tubes, and the resistors 60—61 in series, and the mean value of said current made representative of the durations of said impulses, as set forth in connection with Figs.

1 and 2. By establishing a balance through the procedure of setting the sliding contact 59 until a zero deflection is obtained on the galvanometer 62, the position of the pointer or index 64 with respect to the graduated scale 65 will become a measure of said impulses, and therefore of the magnitude under measurement at the transmitting end of the circuit 53.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

We claim:

1. A telemetric receiver having means responsive to unidirectional electrical impulses of variable durations and of constant frequency, said means comprising in combination a source of current and a circuit having two branches both including resistor units of fixed resistance values, the first of said branches being continuously energized from said source and a portion of its resistance comprising a slide wire having a movable contact with associated means to provide a measure of the position of said contact, and the second of said branches including a relay element coupled to said transmitting circuit and actuated by impulses therein to produce in said second branch impulses of current from said source corresponding in duration to those developed by said transmitting means, means for maintaining a fixed relation between the amplitudes of the currents in both said branches, a connection between said contact and a selected point on the resistance units in said second branch and including detector means responsive to current flowing in said connection, and means for translating said contact with respect to said slide wire to reduce to zero the average value of said current.

2. A telemetric receiver having means responsive to unidirectional electrical impulses of variable durations and of constant frequency, said means comprising in combination a source of current and a circuit having two branches both including resistor units of fixed resistance values, the first of said branches being continuously energized from said source and a portion of its resistance comprising a slide wire having a movable contact with associated means to provide a measure of the position of said contact, and the second of said branches including a relay element coupled to said transmitting circuit and actuated by impulses therein to produce in said second branch impulses of current from said source corresponding in duration to those developed by said transmitting means, means for maintaining the amplitude of current constituting said impulses at a value proportional to the voltage of said source, a connection between said contact and a selected point on the resistance units in said second branch and including detector means responsive to current flowing in said connection, and means for translating said contact with respect to said slide wire to reduce to zero the average value of said current.

3. A telemetric receiver having means responsive to unidirectional electrical impulses of variable durations and of constant frequency, said means comprising in combination a source of current and a circuit having two branches both including resistor units of fixed resistance values, the first of said branches being continuously energized from said source and a portion of its resistance comprising a slide wire having a movable contact with associated means to provide a measure of the position of said contact, and the second of said branches including a relay element coupled to said transmitting circuit and actuated by impulses therein to produce in said second branch impulses of current from said source corresponding in duration to those developed by said transmitting means, means in said first branch having characteristics similar to those of said relay means whereby to subject the current in said first branch to such variations as said relay means may introduce into that in said second branch other than those variations due to the influence of said transmitted impulses, a connection between said contact and a selected point on the resistance units in said second branch and including detector means responsive to current flowing in said connection, and means for translating said contact with respect to said slide wire to reduce to zero the average value of said current.

4. A telemetric receiver having means responsive to unidirectional electrical impulses of variable durations and of constant frequency, said means comprising two electron discharge devices, each with a cathode, and anode and a control electrode, said devices being of similar characteristics, a source of energy, and, energized from the same, a divided circuit having two branches, the first of said branches including the cathode and the anode of one of said discharge devices and resistance units comprising a slide-wire resistor having a movable contact with associated means to provide a measure of the position of the same with respect to the slide-wire and the second of said branches including the cathode and the anode of the other of said discharge devices and a resistor having a tap thereon, and the control electrode and the cathode of said last named device being coupled to said transmitting circuit to produce in said anode and in said second branch impulses corresponding in duration to those developed by said transmitting means, a connection between said contact and said tap, and including detector means responsive to current flowing in said connection, and means for translating said contact with respect to said slide wire to reduce to zero the average value of said current.

5. A telemetric receiver having means responsive to unidirectional electrical impulses of variable durations and of constant frequency, said means comprising two electron discharge devices, each with a cathode, and anode and a control electrode, said devices being of similar characteristics, a source of energy, and, energized from the same, a divided circuit having two branches, the first of said branches including the cathode and the anode of one of said discharge devices and resistance units comprising a slide-wire resistor having a movable contact with associated means to provide a measure of the position of the same with respect to the slide-wire and the second of said branches including the cathode and the anode of the other of said discharge devices and a resistor having a tap thereon, and the control electrode and the cathode of said last named device being coupled to said transmitting circuit to produce in said anode and in said second branch impulses corresponding in duration to those developed by said transmitting means, the control electrodes of both discharge devices being connected to their respective cathodes through resistors, a connection between said contact and said tap, and including detector means responsive to current flowing in said connection, and means for translating said contact with respect to said slide wire to reduce to zero the average value of said current.

6. A telemetric receiver having means responsive to unidirectional electrical impulses of variable durations and of constant frequency, said means comprising in combination an electron discharge device having a cathode, an anode, and a control electrode, a source of current, and a circuit having two branches each including resistor units of fixed resistance values, the first of said branches being continuously energized from said source and a portion of its resistance comprising a slide wire having a movable contact with associated means to provide a measure of the position of said contact with respect to the slide wire, and the second of said branches including the cathode and the anode of said discharge device, said control electrode being coupled to said transmitting circuit to produce in said anode and in said second branch impulses corresponding in duration to those developed by said transmitting means, means for rendering the characteristics of said discharge device substantially linear despite variations in voltage of said source, a connection between said contact and a selected point on the resistance units in said second branch and including detector meas responsive to current flowing in said connection, and means for translating said contact with respect to said slide wire to reduce to zero the average value of said current.

7. A telemetric receiver having means responsive to unidirectional electrical impulses of variable durations and of constant frequency, said means comprising a potentiometer having a branched circuit, means for establishing a predetermined potential gradient in one of said branches, means for establishing in the other of said branches an electric current having an average value dependent solely upon the duration of said impulses with respect to time, and null-type measuring means adapted to oppose the potential across a selected portion of said last-named branch to more or less of the potential along said gradient to reduce to zero the difference between said potentials, thereby providing a measure of impulse-duration.

8. A telemetric receiver having means responsive to unidirectional electrical signals of variable duration and of substantially constant frequency, said means comprising a bridge network having a single adjustable slide-wire and means cooperating therewith and movable to balance said network, means to provide a measure of the position of said movable means, a single source of unidirectional current for continuously energizing said network, and, included in said network, a relay element responsive to said signals to produce in a portion of said network unidirectional voltage impulses of substantially constant amplitude from the last mentioned source and corresponding in duration with said signals, together with an unbalance detector included in said network, responsive to unidirectional current and insensitive to variations in the frequency of said signals, and means subject to said detector to actuate said movable balancing means to establish a balance between the average value of said impulses and a portion of the potential in said slide-wire.

9. A telemetric receiver having means responsive to unidirectional electrical signals of variable duration and of substantially constant frequency, said means comprising a bridge network, having two branches, both including resistor units of fixed resistance values, a single source of unidirectional current for continuously energizing said network, said network having a single adjustable slide-wire and a movable contact cooperating therewith to balance said network, means to provide a measure of the position of said movable means, said slide wire forming a resistor unit in one of said network branches, and the second of said branches including a relay element responsive to said signals to produce in said second branch unidirectional voltage impulses of substantially constant amplitude from the last mentioned source and corresponding in duration with said signals, a connection between said contact and a selected point on the resistance in said second branch, said connection including detector means responsive to current flowing in said connection, and motor means controlled by said detector means for translating said contact with respect to said slide wire to reduce to zero the average value of said current in said connection.

10. A telemetric receiver having means responsive to unidirectional electrical signals of variable duration and of substantially constant frequency, said means comprising a bridge network, having two branches, both including resistor units of fixed resistance values, a single source of unidirectional current for continuously energizing said network, said network having a single adjustable slide-wire and a movable contact cooperating therewith to balance said network, means to provide a measure of the position of said movable means, said slide wire forming a resistor unit in one of said network branches, an electron discharge device having a cathode, an anode, and a control electrode, the second of said network branches including the cathode and anode of said discharge device, and said control electrode being responsive to said signals to produce in said anode and in said second branch unidirectional voltage impulses of substantially constant amplitude from the last mentioned source and corresponding in duration with said signals, a connection between said contact and a selected point on the resistance in said second branch, said connection including detector means responsive to current flowing in said connection, and motor means controlled by said detector means for translating said contact with respect to said slide wire to reduce to zero the average value of said current in said connection.

PERRY A. BORDEN.
GUSTAVE M. THYNELL.

REFERENCES CITED

The following references are of record in the file of this patent:

UNITED STATES PATENTS

| Number | Name | Date |
|---|---|---|
| 1,694,237 | Simonds | Dec. 4, 1928 |
| 2,015,967 | Ryder | Oct. 1, 1935 |
| 2,183,399 | Heising | Dec. 12, 1939 |
| 2,223,840 | Wolff | Dec. 3, 1940 |
| 2,287,174 | Heising | June 23, 1942 |